United States Patent
Veazey et al.

(10) Patent No.: US 7,376,799 B2
(45) Date of Patent: May 20, 2008

(54) SYSTEM FOR REDUCING THE LATENCY OF EXCLUSIVE READ REQUESTS IN A SYMMETRIC MULTI-PROCESSING SYSTEM

(75) Inventors: Judson Eugene Veazey, Fort Collins, CO (US); Blaine Douglas Gaither, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 326 days.

(21) Appl. No.: 11/186,333

(22) Filed: Jul. 21, 2005

(65) Prior Publication Data
US 2007/0022254 A1    Jan. 25, 2007

(51) Int. Cl.
*G06F 12/00* (2006.01)
(52) U.S. Cl. ............. 711/144; 711/142; 711/143; 711/156; 711/207; 710/317
(58) Field of Classification Search ........... 711/143, 711/144, 142, 156, 207; 710/317
See application file for complete search history.

(56) References Cited

U.S. PATENT DOCUMENTS

| 5,887,146 A | * | 3/1999 | Baxter et al. ............. 710/104 |
|---|---|---|---|
| 7,051,150 B2 | * | 5/2006 | Naumann et al. .......... 710/317 |
| 2003/0131203 A1 | * | 7/2003 | Berg et al. ................. 711/146 |
| 2005/0086438 A1 | * | 4/2005 | Peterson et al. ........... 711/141 |

* cited by examiner

Primary Examiner—Stephen Elmore

(57) ABSTRACT

A symmetric multi-processing system for processing exclusive read requests. The system includes a plurality of cell boards, each of which further includes at least one CPU and cache memory, with all of the cell boards being connected to at least one crossbar switch. The read-latency reducing system includes write-through cache memory on each of the cell boards, a modified line list on each crossbar switch having a list of cache lines that have been modified in the cache memory of each of the cell boards, and a cache coherency directory on each crossbar switch for recording the address, the status, and the location of each of the cache lines in the system. The modified line list is accessed to obtain a copy of a requested cache line for each of the exclusive read requests from the cell boards not containing the requested cache line.

19 Claims, 5 Drawing Sheets

SYSTEM FOR REDUCING THE LATENCY OF EXCLUSIVE READ REQUESTS IN A SYMMETRIC MULTI-PROCESSING SYSTEM

BACKGROUND

A symmetric multi-processing (SMP) system contains one or more CPU cell boards. A CPU cell board contains one or more CPUs, cache, and memory. The cell-boards are connected by a 'system fabric', typically, a set of links, including one or more crossbar switches. Data can be shared between cell boards (and also between CPUs on a single cell-board), but a protocol must be followed to maintain cache coherency. Although caches can share data, the same memory address can never have different values in different caches.

A common cache coherency implementation uses directories, called cache-coherency directories, which are associated with each cache. A cache coherency directory records the addresses of all the cache lines, along with the status (e.g., invalid, shared, exclusive) and the location of the line in the system. A bit vector is generally used to represent the cache line location, each bit corresponding to a processor or (in some implementations) a processor bus. Given the information in the cache coherency directory, a protocol is implemented to maintain cache coherency.

In a typical cache-coherency protocol, each cache address has a home directory, and exclusive reads that miss cache anywhere in the system go first to that directory. Unless the address missed is 'local' (to a particular cell board), a cache miss must make a traverse of the system fabric. Depending on the configuration of the system fabric, one or more crossbar switches must be crossed to reach the home directory for a particular address (if the address missed was not a local address).

Once the request reaches the home directory, there are three possible cases:

1. No remote copies of the line exist (as determined from the directory). In this case, the home directory fetches the requested line from either local memory or local cache, and sends it across the system fabric to the requesting CPU.
2. remote shared copies exist. In this case the home directory must send 'invalidate' commands to all the nodes that contain copies, and then fetch the requested line from either local memory or local cache, and send it across the system fabric to the requesting node.
3. remote exclusive copy exists. The home directory fetches that copy, invalidates it in the remote cache, and then sends it to the requesting node.

The latency of these requests is dominated by the number of hops, each of which increases the time required to traverse the system fabric. As SMPs grow larger, the number of crossbar switches and the length of the links between nodes increase, which in turn lengthens the average time required to make a hop. Also, some SMP designs keep the directory in main memory (as opposed to cache), causing case 3, above, to take even more time.

There is a design problem with the above type of system that parallels the performance problem: increasing the number of crossbar switches and links reduces hop latency, but the expense of these extra components, and the difficulty of designing them into a cabinet of a given size, and of powering and cooling them, are not trivial issues.

SUMMARY

A symmetric multi-processing system is provided for processing exclusive read requests. The system includes a plurality of cell boards, each of which includes at least one CPU and cache memory, with all of the cell boards being connected to at least one crossbar switch. The system further includes write-through cache memory on each of the cell boards, a modified line list on each crossbar switch having a list of cache lines that have been modified in cache memory of each of the cell boards, and a cache coherency directory, also on each crossbar switch, for recording the address, the status, and the location of each of the cache lines in the system. The modified line list is accessed to obtain a copy of a requested cache line for each of the exclusive read requests from the cell boards not containing the requested cache line.

DETAILED DESCRIPTION

Figure 1A:
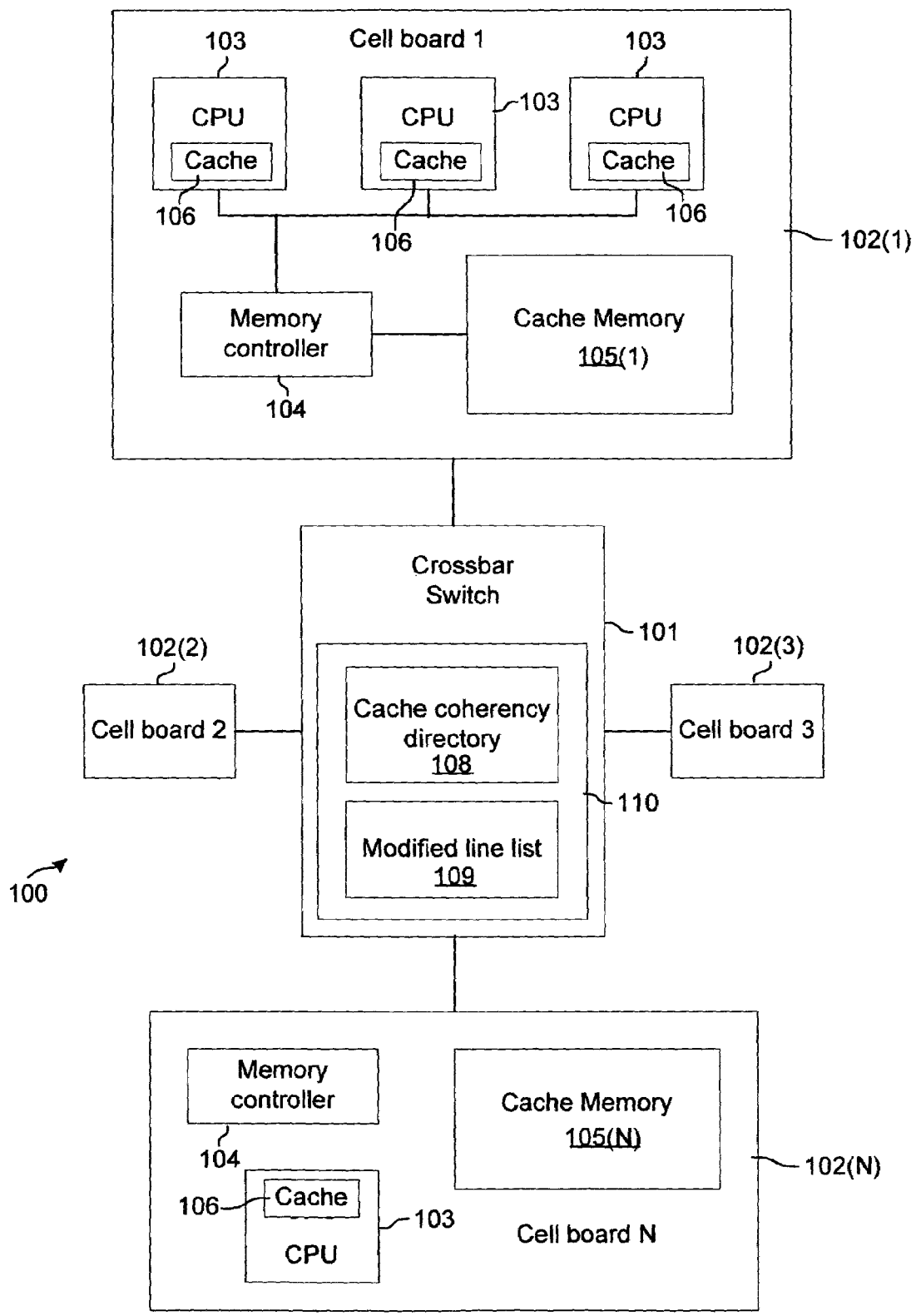
FIG. 1A is a diagram of an exemplary embodiment of the present system.
Figure 1B:
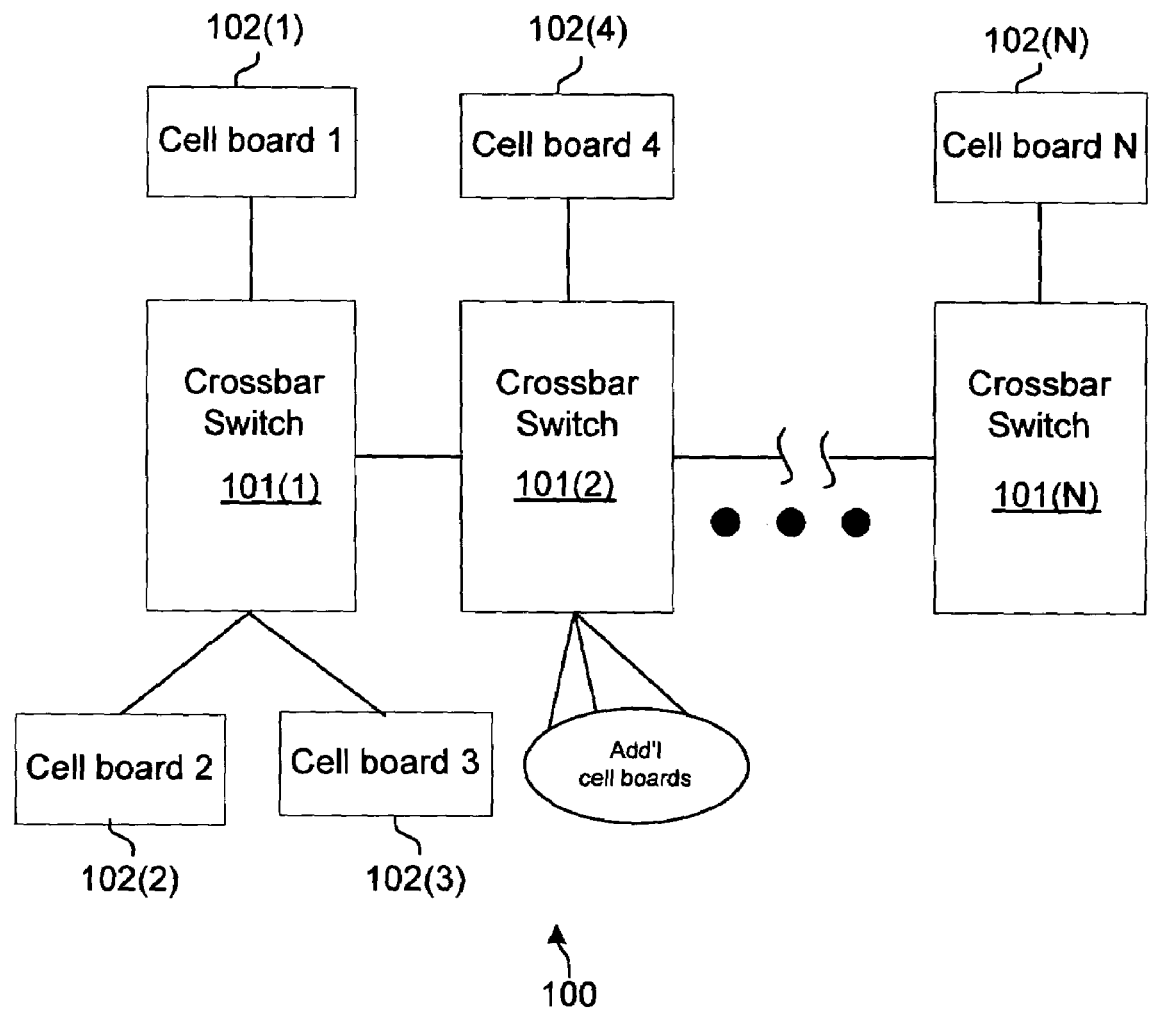
FIG. 1B is a diagram of an exemplary embodiment of the present system with multiple crossbar switches.

The present system comprises a symmetric multi-processing (SMP) system including at least one crossbar switch. FIG. 1A is a diagram of an exemplary embodiment of the present system 100, which comprises a plurality of cell boards 102(*) intercoupled via crossbar switch 101. In the present document, an asterisk in parentheses '(*)' following a reference number refers to one or more occurrences of the entity represented by the reference number, where a plurality of entities of the type thus designated may exist in at least one embodiment. FIG. 1B is a diagram of an exemplary embodiment of the present system with a plurality of crossbar switches 101(1), 101(2), ... 101(N). It should noted that alternative embodiments of the present system may include more than one crossbar switch 101(*), which functions in a manner analogous to the single crossbar switch described herein, with certain cache coherency directory addressing differences as indicated below.

As shown in FIG. 1A, each cell board 102(*) includes one or more processors ('CPUs') 103 including processor cache memory 106, memory 105 shared by the processors, and a memory controller 104. Each physical cell board 102 has a corresponding analogous logical entity called a 'cell', and the term "cell 102" is used hereinafter to refer to this logical counterpart, unless the reference is specifically directed to the physical cell board. Crossbar switch 101 includes system memory 110, which includes a centralized cache coherency directory 108, and a list 109 of modified cache lines, stored by crossbar logic. When the crossbar switch 101 detects that a cache line has been modified (by examining the response given in the cache coherency protocol), it stores the cache line in the modified line list 109.

A cache line is the basic unit of cache storage, just as an addressable word is the basic unit of memory storage. For example, cache lines may consist of 128 bytes, or 4 words. The hierarchy of data storage units (from smallest to largest) is:

Bit
Byte
Word
Cache Line
Cache Set

There are larger units of data than a cache set, but at the cache level of hardware the cache set is the biggest visible unit.

Modified line list 109 shortens the average latency for exclusive reads. For example, if a cache line is modified in cell A, then when cell B requests that line, it is not necessary to traverse the system fabric to cell A to retrieve the line, since the modified line is cached in a central location.

In the present system, cache memory 105 on each of the cell boards 102 is write-through cache. With write-through cache, any cache line (or more simply, "line") that is modified on a particular cell board's cache, for example, on cache 105(1), is sent out to the crossbar modified line list 109, where requests from other cell boards **102(\*) can access the modified line more quickly than if it were stored only in the particular board's local cache memory 105(1)**.

The format of an exemplary cache-coherency directory 108 is shown in Table 1, below

TABLE 1

| Cache-coherency Directory 108 | | | |
|---|---|---|---|
| cache ID | tag | index | status |

In an exemplary embodiment, the following fields are present in each cache coherency directory 108:

| | |
|---|---|
| 'cache ID' | identifies the current location of the cache line. For shared lines, there can be more than one entry. |
| 'index' | identifies the cache line set; and |
| 'tag' | identifies the line within the set |
| 'status' | MESI - 'modified', 'exclusive', 'shared' or 'invalid' (for example). |

Cache lines are grouped in sets to simplify hardware design. The cache ID is the identifier of the cache, and indicates the particular cache **105(\*) in which the line currently resides. The cache line address includes a tag field, an index field, and a block offset field (which is used to find the line within a set). The block offset refers to the word within the cache line, and it is not needed for a directory entry, as the read request will provide that information. Thus, each cache coherency directory entry contains all the information needed to allow a requestor to access a particular cache line, while simultaneously allowing the system to maintains cache coherency. In an exemplary embodiment, cache-coherency directory 108 is implemented in content-addressable memory (CAM), and modified cache line list 109 is implemented in conventional DRAM, although directory 108 and modified line list 109 may, alternatively, be implemented via any other suitable type of memory. Logic in crossbar switch 101 handles updating of the cache coherency directory 108**.

The use of a centralized cache coherency directory 108 provides for protocol optimization, and also allows modified cache lines to be positioned centrally (in crossbar switch 101) in cases where they are requested by a cell **102(\*)** that does not have local copy of a requested line. The present system implements a protocol to maintain cache coherency, as is well known in the art. (See, for example, Chapter 8.4 of *Computer Architecture, A Quantitative Approach* (2nd. Ed.), Hennessey and Patterson, Morgan-Kaufmann publisher, ISBN 1-55860-329-8).

In the present embodiment, processor caches 106 on the cell boards are implemented as write-through caches, so that it can be can determined from cache-coherency directory 108 whether a given cache line is modified or not. The use of write-through cache 105 on each of the cell boards **102(\*), allows the cache coherency directory (108**) to determine whether a given line has been modified or not.

Figure 2A:
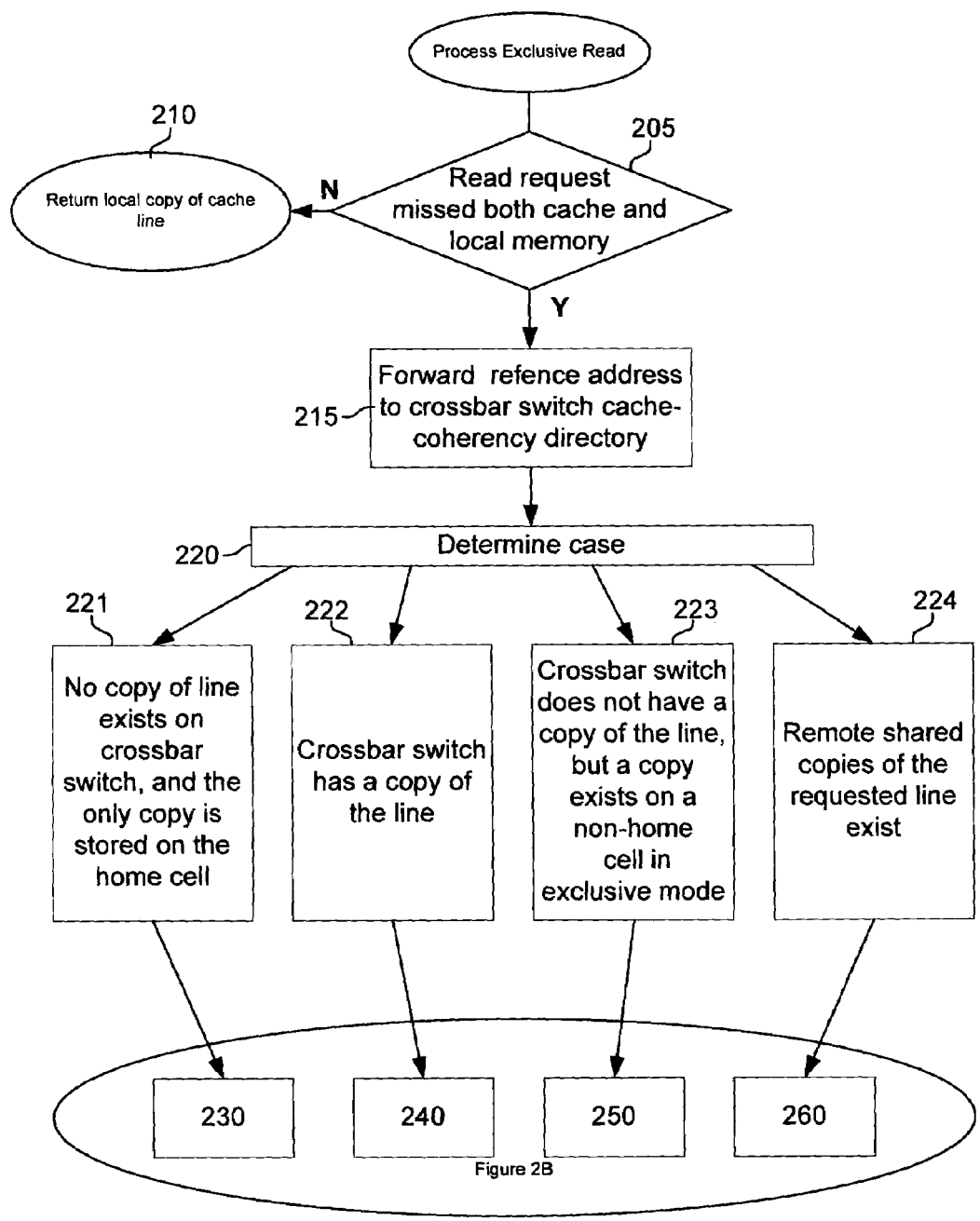
FIGS. 2A and 2B are flowcharts showing an exemplary set of steps performed in processing an exclusive read request in one embodiment of the present system.
Figure 2B:
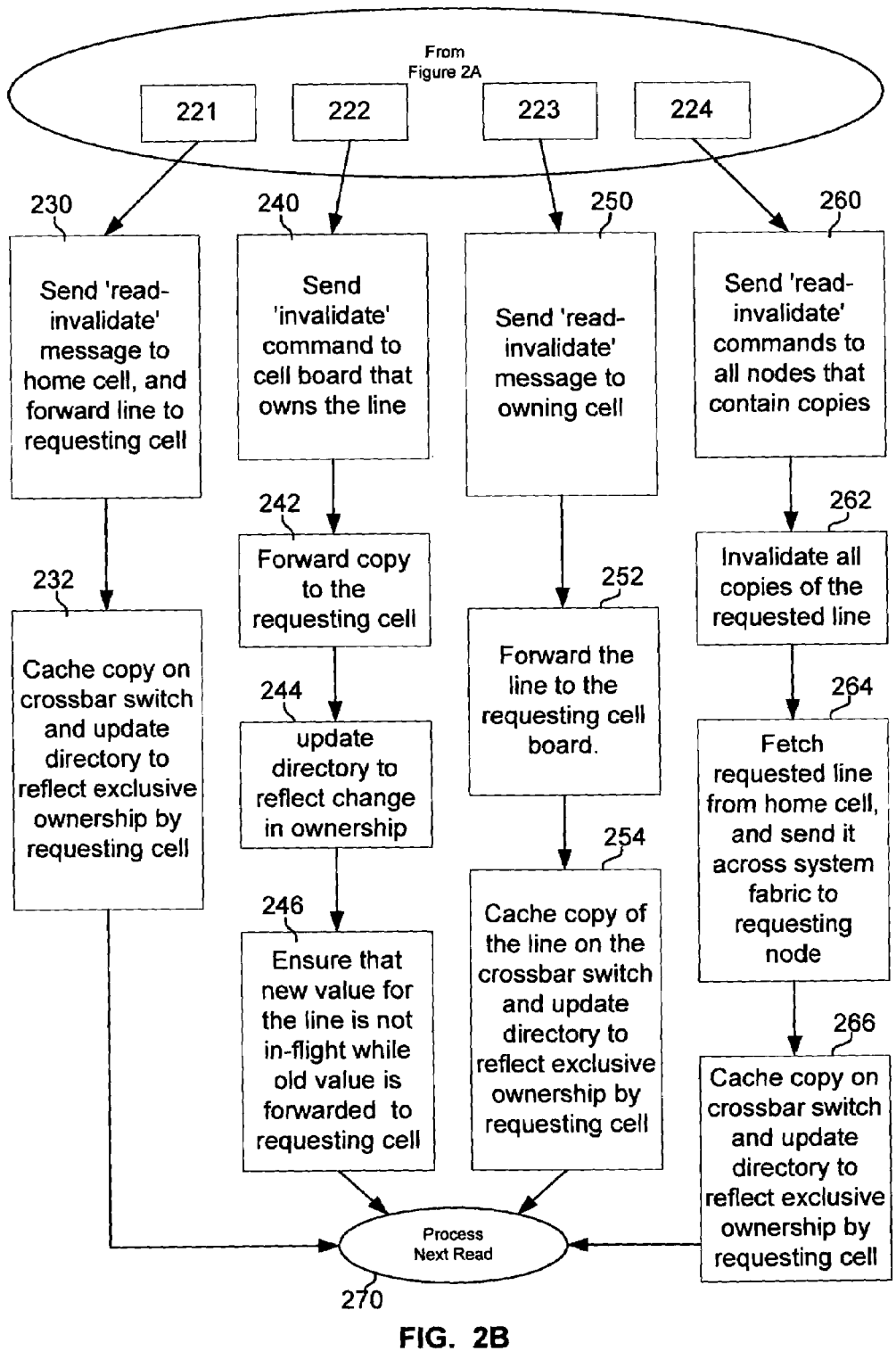

FIGS. 2A and 2B are flowcharts showing an exemplary set of steps performed in processing an exclusive read request, in one embodiment of the present system. As shown in FIG. 2A, when (at step 205) an exclusive read (request) misses both cache and local memory in a particular cell **102(\*), the requested address is forwarded, at step 215, to the 'home' crossbar switch cache-coherency directory 108** for the requested memory address.

The usual meaning of 'home' is relative to a system wherein the address space is divided among the cells. In such a system, if there are 8 addresses and 2 cells, each cell has 4 addresses, and that cell is a 'home cell' to those 4 addresses. If a cache-coherency directory is resident on the cell (as in the prior art), then 'home directory' is a natural extension of 'home cell'. However, in the present system, the cache-coherency directories previously located in each of the cells have been removed from the cells, while maintaining the address-partitioning feature, by combining the directories of each of the cells on the crossbar switch 101. Therefore, in a multiple-crossbar system, there is more than one 'home' crossbar switch cache-coherency directory, the actual location of which is a function of the requested memory address. In this document, the home cell for a particular cache line is referred to as cell 102(H), and the requesting cell is referred to as cell 102(R), even though those specific reference numbers are not present on a drawing (since the home cell and requesting cell are situation-dependent).

In a system such as that shown in FIG. 1A, where the system has only one crossbar switch, the system address space of interest consists essentially of system memory 110 in crossbar switch 101. In a system having multiple crossbar switches 101, such as the system shown in FIG. 1B, the system address space is initially partitioned among the available crossbar switches. Thus, in the present system, the cache-coherency directory 108 on a hypothetical crossbar switch 'A' will handle addresses 0-3, the cache-coherency directory on a hypothetical crossbar switch 'B' will handle addresses 4-7, and so forth.

In a multiple-crossbar version of the present system, the 'home directory' (the home cache coherency directory) 108 for a particular memory address is determined in accordance with the following procedure: If there are, for example, 4 home directories 108 on 4 crossbar switches 101, then 2 bits of the requested address are used to determine which crossbar 101 has the appropriate directory.

Although the specific 2 bits that are used to locate the appropriate crossbar is implementation-specific, the basic concept is that the crossbar addresses are used to designate the cache-coherency directories 108 as well. Thus, there is one directory 108 per crossbar 101, and each directory is 'home' to a particular set of addresses.

As indicated in FIG. 2A, if the cell **102(\*) generating the exclusive read has a local copy of the requested cache line, then the line is returned at step 210**, and no (further) processing by the present system is necessary for this particular request. If, however, the cell receiving a read request does not have a local copy of the requested cache line, then the situation is termed a 'cache miss'. When a receiving cell 102(*) does not have a local copy of the requested cache line, the cell sends the request for a line (the requesting cell need provide only an address for the requested line) to the appropriate crossbar switch 101 (*), thus indicating that the line was neither in cache nor memory on that cell.

Figure 3:
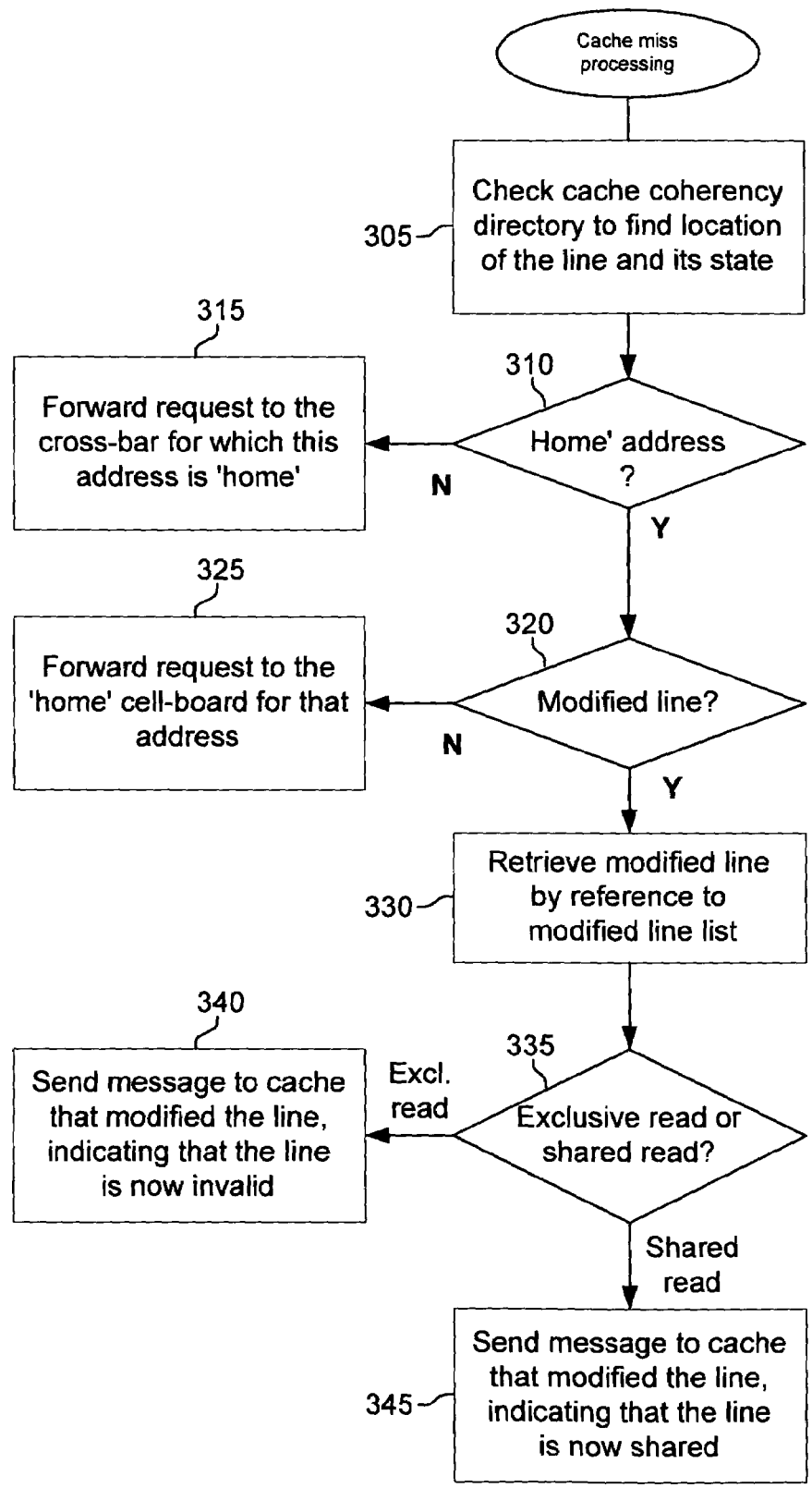
FIG. 3 is a flowchart showing an exemplary set of steps performed by one embodiment of the present system in processing a cache miss.

FIG. 3 is a flowchart showing an exemplary set of steps performed by one embodiment of the present system in processing a cache miss, which, in general, is handled by the present system in the manner described as follows:

At step 305, crossbar switch 101 checks its cache coherency directory 108 to find the location of the requested line and its state (e.g., modified, exclusive, shared, or invalid). If, at step 310, the line address is determined to be a 'not-home' address, then at step 315, the crossbar switch 101 (*) presently handling the request forwards the request to the crossbar switch 101 (*) for which this address is 'home'. Otherwise, if the address is a 'home' address, then at step 320, cache coherency directory 108 is checked to determine whether the line has been modified. If the line is not a modified line, then crossbar switch 101 forwards the request to the 'home' cell-board for that address, at step 325. If the cache coherency directory 108 indicates that the line is modified, the line should be in the crossbar switch's modified line list 109.

At step 330 the crossbar switch 101 retrieves the modified line by a method analogous to accessing cache memory; i.e., by using content-addressable tags that point to the physical address indicated in the modified line list 109. A check is then made at step 335 to determine whether the request for a cache line was an exclusive read, or a shared read. If the request was a shared read, then at step 345, the crossbar switch sends a message to the cache that modified the line, indicating that the line is shared. In some protocols, the line is invalidated. If the request was for an exclusive read, then at step 335 the crossbar switch sends a message to the cache that modified the line, indicating that the line is now invalid.

Thus it can bee seen that the crossbar cache coherency directory 108 is used to determine where a requested cache line is presently located, and also whether the line has been modified or not. If the address of the requested line is a 'home' address and it has been modified, the line will be in the modified line list 109 on the appropriate crossbar switch 101(*) Every other type of request gets forwarded, either to another crossbar switch 101(*) or to a cell 102(*).

As indicated in FIG. 2A, once a cache line request reaches the home crossbar directory 108, there are four possible cases, determined at step 220, by an inspection of the cache coherency directory 108 in crossbar switch 101. Note that FIG. 2B is a continuation flowchart of FIG. 2A, with blocks 221-224 in FIG. 2A continued in FIG. 2B, at blocks 230, 240, 250, and 260, respectively. The operations performed in blocks 221-224 are described below:

At block 22 there is no copy of the cache line on the crossbar switch and the only copy is stored in the home cell 102(H), where it may or may not be in exclusive mode. As shown in FIG. 2B, in this situation, the crossbar switch 101 receiving the request sends a 'read-invalidate' message to the home cell 102(H), and forwards the line to the requesting cell 102(R), at step 230. Note that 'read-invalidate' implies that the home cell replies with the current version of the line.

A copy of the requested line is cached on the crossbar switch 101 and the cache-coherency directory 108 is updated to reflect exclusive ownership by the requesting cell 102(R), at step 232. The next exclusive read request is then processed at step 205 (in FIG. 2A).

At block 222 the crossbar switch has a copy of the requested line. As shown in FIG. 2B, in this case the crossbar switch 101 receiving the request sends an 'invalidate' command to the cell 102(*) that owns the line, at step 240, and then forwards its copy to the requesting cell, at step 242. Next, at step 244, the crossbar's cache coherency directory 108 is updated to reflect the change in ownership. In an exemplary embodiment, the implementation may include a mechanism for avoiding a race condition where the cell that owns the line is in the process of writing-through a new value when the requesting cell's read-exclusive command reaches the crossbar. At step 246, a provision is made, such as handshaking or redo, to ensure that a new value for the line is not in-flight while the old value is being forwarded to the requesting cell. This maintaining of a copy of the line in the crossbar saves one memory read and two fabric hops over previous methods. The next exclusive read request is then processed at step 205 (in FIG. 2A).

At block 223 the crossbar switch does not have a copy of the requested line but there is a copy of the line on a non-home cell 102(*) in exclusive mode. As shown in FIG. 2B, in this situation, the crossbar switch 101 receiving the request sends a 'read-invalidate' message to the cell owning the cache line, at step 250, and forwards the line to the requesting cell board, at step 252. A copy of the line is cached on the crossbar switch and the directory is updated to reflect exclusive ownership by the requesting cell, at step 254. The next exclusive read request is then processed at step 205 (in FIG. 2A).

At block 224 remote shared copies of the requested line exist as determined by cache coherency directory 108. As shown in FIG. 2B, in this case, the crossbar switch 101 receiving the request sends 'read-invalidate' commands to all the cells that contain copies, at step 260, invalidates all copies of the requested line, at step 262, and then fetches the requested line from the home cell and sends it across the system fabric to the requesting cell, at step 264. A copy of the line is cached on the crossbar switch 101 and the cache coherency directory 108 is updated to reflect exclusive ownership by the requesting cell, at step 266. The next exclusive read request is then processed at step 205 (in FIG. 2A).

For cache lines that are frequently modified, the case represented by block 222 (and following blocks) should be the most common case; thus the caching of hot lines will result in a significant reduction in average off-cell latency.

Certain changes may be made in the above methods and systems without departing from the scope of the present system. It is to be noted that all matter contained in the above description or shown in the accompanying drawings is to be interpreted as illustrative and not in a limiting sense. For example, the system shown in FIGS. 1A and 1B may be constructed to include components other than those shown therein, and the components may be arranged in other configurations. The elements and steps shown in FIGS. 2A, 2B, and 3 may also be modified in accordance with the methods described herein, and the steps shown therein may be sequenced in other configurations without departing from the spirit of the system thus described.

What is claimed is:

1. A symmetric multi-processing system for processing exclusive read requests, the system including a plurality of cell boards, each including at least one CPU and cache memory, connected to at least one crossbar switch, the system comprising:

the cache memory on each one of the cell boards being write-through cache memory;

a modified line list, on each said crossbar switch, including storage for cache lines that have been modified in the cache memory of each of the cell boards;

a cache coherency directory, on each said crossbar switch, for recording the address, the status, and the location of each of the cache lines in the system; and wherein the modified line list is accessed, to obtain a copy of a requested cache line for each of the exclusive read requests from the cell boards not containing the requested cache line.

2. The system of claim 1, wherein the status is a state selected from the group consisting of invalid, shared, and exclusive states.

3. The system of claim 1, wherein, when at least one said crossbar switch has a copy of the requested cache line, a copy of the requested cache line is sent, from the crossbar switch having a copy of the requested cache line, to the cell board requesting the requested cache line, and the cache coherency directory is updated to indicate a change in ownership of the requested cache line.

4. The system of claim 1, wherein, when no said crossbar switch has a copy of the requested cache line, but a copy of the requested cache line exists on a non-home cell board, a copy of the requested cache line is stored on one said crossbar switch, and the cache coherency directory is updated to indicate exclusive ownership by the cell board requesting the requested cache line.

5. The system of claim 1, wherein, when no copy of the requested cache line exists on any said crossbar switch, and the only said copy is stored on a home cell board, the requested cache line is forwarded to the cell board requesting the requested cache line, the copy is stored on one said crossbar switch, and the cache coherency directory is updated to indicate exclusive ownership by the cell board requesting the requested cache line.

6. The system of claim 1, wherein, when no said crossbar switch has a copy of the requested cache line, but a copy of the requested cache line exists on one of the non-home cell boards, the requested cache line is sent, from the crossbar switch having a copy of the requested cache line, to the cell board requesting the requested cache line, a copy of the requested cache line is stored on one said crossbar switch, and the cache coherency directory is updated to indicate exclusive ownership by the cell board requesting the requested cache line.

7. The system of claim 1, wherein, when remote shared copies of the requested cache line are present in the system, the requested cache line is fetched from its home cell and sent to the cell board requesting the requested cache line, a copy of the requested cache line is stored on one said crossbar switch, and the cache coherency directory is updated to indicate exclusive ownership by the cell board requesting the requested cache line.

8. A symmetric multi-processing system for processing exclusive read requests, the system including a plurality of cell boards, each including at least one CPU and cache memory, connected to a crossbar switch, the system comprising:

write-through cache memory on a plurality of the cell boards;

a modified line list, on the crossbar switch, including storage for cache lines that have been modified in the cache memory of each of the cell boards; and a cache coherency directory, on said crossbar switch, for recording the address, the status, and the location of each of the cache lines in the system;

wherein the modified line list is accessed, to obtain a copy of a requested cache line for each of the exclusive read requests from the cell boards not containing the requested cache line; and wherein, when the crossbar switch has a copy of the requested cache line, a copy of the requested cache line is sent to the cell board requesting the requested cache line and the cache coherency directory is updated to indicate a change in ownership of the requested cache line.

9. The system of claim 8, wherein, when no said crossbar switch has a copy of the requested cache line, but a copy of the requested cache line exists on a non-home cell board, a copy of the requested cache line is stored on one said crossbar switch, and the cache coherency directory is updated to indicate exclusive ownership by the cell board requesting the requested cache line.

10. A method for processing exclusive read requests in a symmetric multi-processing system including a plurality of cell boards, each including at least one CPU and cache memory, connected to at least one crossbar switch, the method comprising:

including write-through cache memory on each one of the cell boards;

including a modified line list, on each said crossbar switch, the modified line list including storage for cache lines that have been modified in the cache memory of each of the cell boards;

including a cache coherency directory on each said crossbar switch for recording the address, the status, and the location of each of the cache lines in the system; and accessing the modified line list to obtain a copy of a requested cache line for each of the exclusive read requests from the cell boards not containing the requested cache line.

11. The method of claim 10, wherein no copy of the requested cache line exists on any said crossbar switch, and the only copy of the requested cache line is stored on a home cell board, including the additional steps of:

forwarding the cache line to the requesting cell;

caching a copy of the requested cache line on one said crossbar switch; and updating the cache coherency directory to indicate exclusive ownership by the cell board requesting the requested cache line.

12. The method of claim 10, wherein at least one said crossbar switch has a copy of the requested cache line, including the additional steps of:

sending a copy of the requested cache line, from the crossbar switch having a copy of the requested cache line, to the cell board requesting the requested cache line; and updating the cache coherency directory to indicate a change in ownership of the requested cache line.

13. The method of claim 10, wherein no said crossbar switch has a copy of the requested cache line, but a copy of the requested cache line exists on one of the non-home cell boards, including the additional steps of:

sending the requested cache line to the cell board requesting the requested cache line;

storing a copy of the requested cache line on one said crossbar switch; and updating the cache coherency directory to indicate exclusive ownership by the cell board requesting the requested cache line.

14. The system of claim 10, wherein remote shared copies of the requested cache line are present in the system, including the additional steps of:
   invalidating all copies of the requested cache line;
   fetching the requested cache line from its home cell and sending the requested cache line to the cell board requesting the requested cache line;
   storing a copy of the requested cache line on one said crossbar switch; and
   updating the cache coherency directory to indicate exclusive ownership by the cell board requesting the requested cache line.

15. A method for processing exclusive read requests in a symmetric multi-processing system including a plurality of cell boards, each including at least one CPU and cache memory, connected to at least one crossbar switch, the method comprising:
   including write-through cache memory on each one of the cell boards;
   including a modified line list, on each said crossbar switch, the modified line list including storage for cache lines that have been modified in the cache memory of each of the cell boards;
   including a cache coherency directory on each said crossbar switch for recording the address, the status, and the location of each of the cache lines in the system;
   accessing the modified line list to obtain a copy of a requested cache line for each of the exclusive read requests from the cell boards not containing the requested cache line;
   sending a copy of the requested cache line, from the crossbar switch having a copy of the requested cache line, to the cell board requesting the requested cache line; and
   updating the cache coherency directory to indicate a change in ownership of the requested cache line.

16. The method of claim 15, wherein, when no said crossbar switch has a copy of the requested cache line, but a copy of the requested cache line exists on a non-home cell board, a copy of the requested cache line is stored on one said crossbar switch, and the cache coherency directory is updated to indicate exclusive ownership by the cell board requesting the requested cache line.

17. A symmetric multi-processing system for processing exclusive read requests, the system including a plurality of cell boards having write-through cache memory, each of the cell boards including at least one CPU and cache memory, and each of the cell boards connected to at least one crossbar switch, the method comprising:
   means for storing, on each said crossbar switch, cache lines that have been modified in the cache memory of each of the cell boards having write-through cache memory; and
   means, on each said crossbar switch, for recording the address, the status, and the location of each of the cache lines in the system;
   wherein the modified line list is accessed to obtain a copy of a requested cache line for each of the exclusive read requests from the cell boards not containing the requested cache line.

18. The system of claim 17, wherein, when at least one said crossbar switch has a copy of the requested cache line, a copy of the requested cache line is sent, from the crossbar switch having a copy of the requested cache line, to the cell board requesting the requested cache line, and the cache coherency directory is updated to indicate a change in ownership of the requested cache line.

19. The system of claim 17, wherein, when no said crossbar switch has a copy of the requested cache line, but a copy of the requested cache line exists on a non-home cell board, a copy of the requested cache line is stored on one said crossbar switch, and the cache coherency directory is updated to indicate exclusive ownership by the cell board requesting the requested cache line.

* * * * *